March 9, 1954    G. W. SCHATZMAN    2,671,672
FENDER AND FENDER SHIELD CONSTRUCTION
Filed May 3, 1950    2 Sheets-Sheet 2
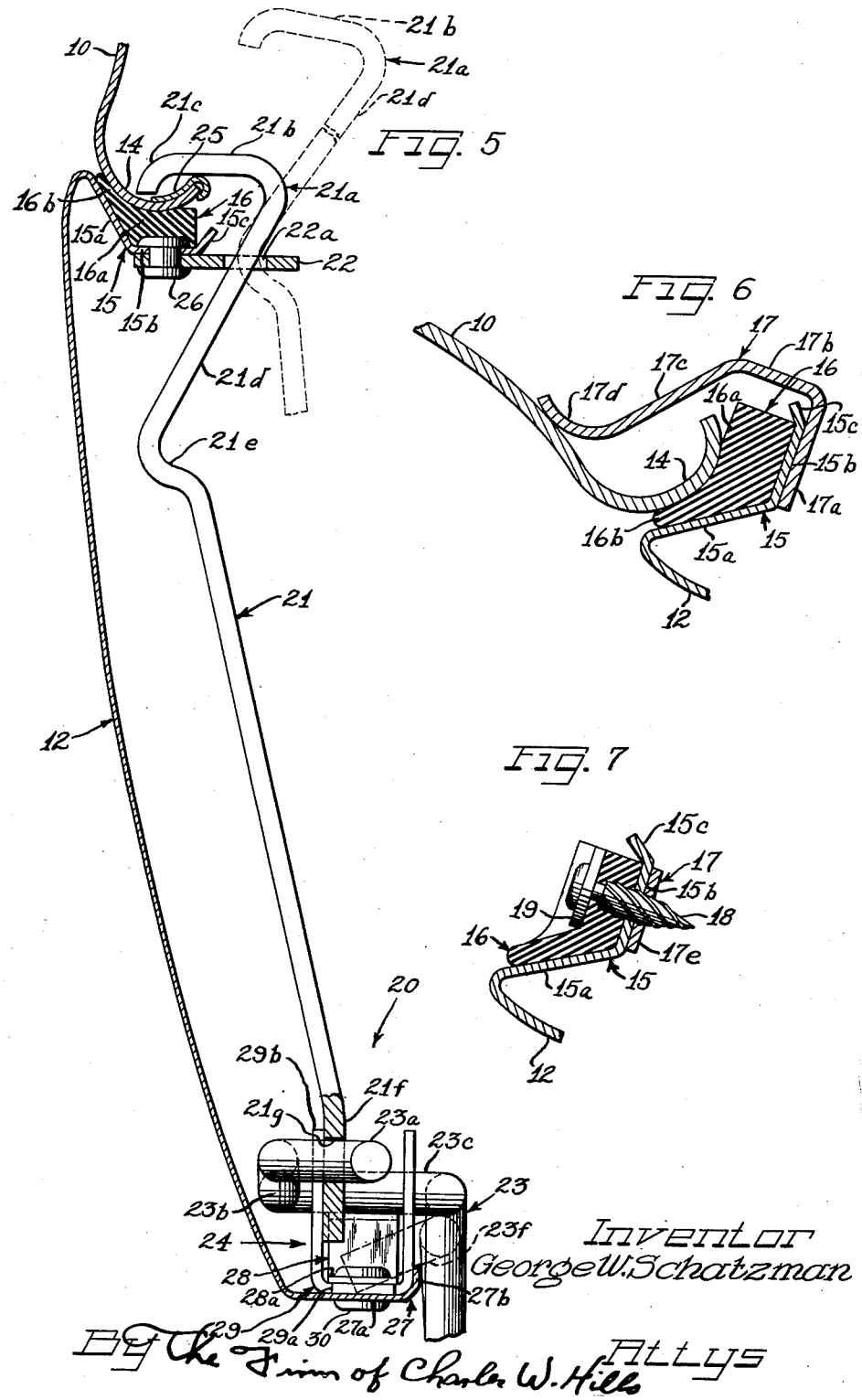

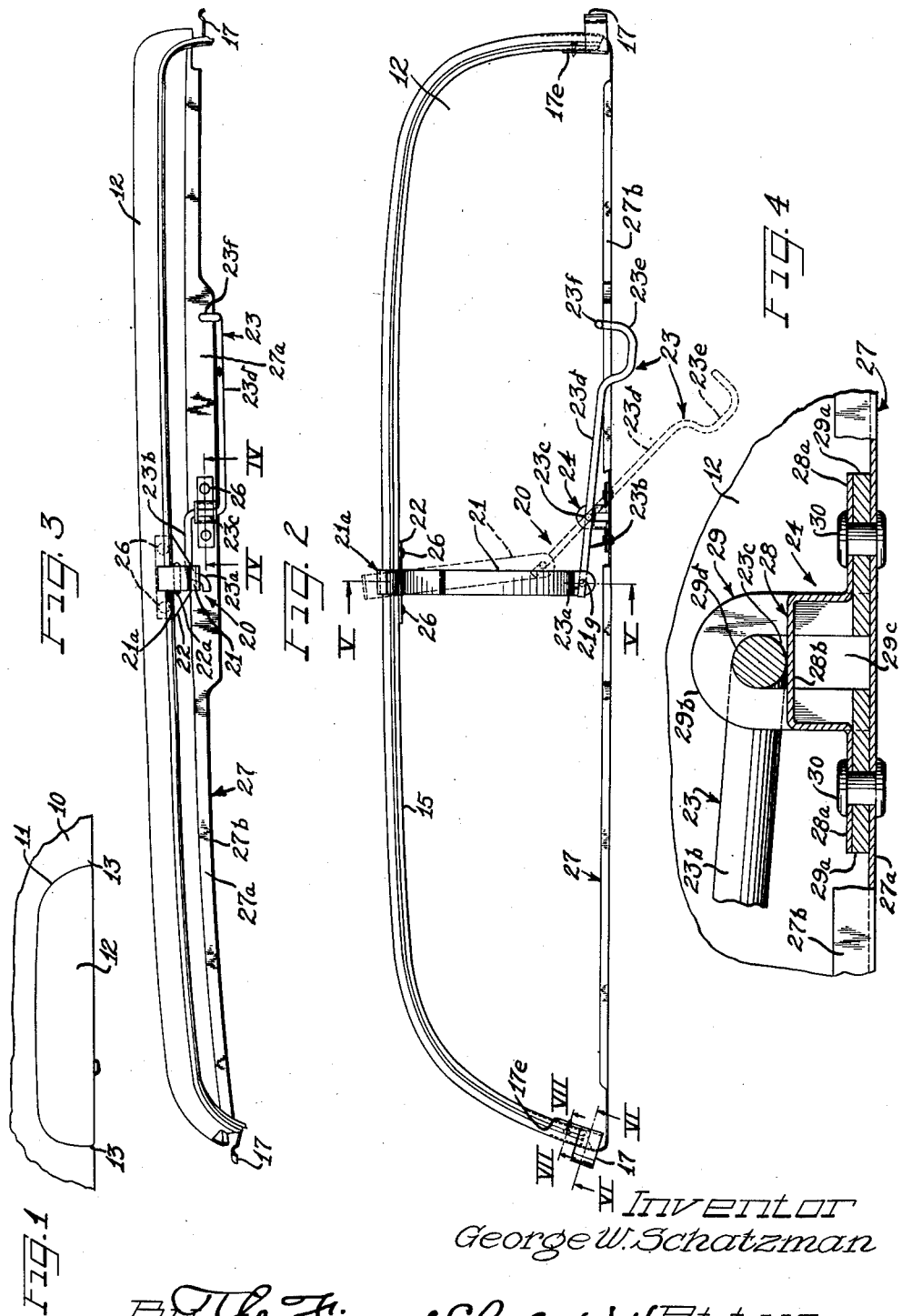

Patented Mar. 9, 1954

2,671,672

UNITED STATES PATENT OFFICE 2,671,672

FENDER AND FENDER SHIELD CONSTRUCTION

George W. Schatzman, Detroit, Mich., assignor to Houdaille-Hershey Corporation, Detroit, Mich., a corporation of Michigan Application May 3, 1950, Serial No. 159,821

12 Claims. (Cl. 280—153)

This invention relates to improvements in fender and fender shield constructions, and more particularly, to improvements in the mounting of a fender skirt or shield on a fender.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axial direction. Since the opening inherently presents a relatively unattractive outward appearance and is, at high speed operation, an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body which is provided for access to or removal of vehicle wheels. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly from the principal body portion of the vehicle.

An important object of the present invention is to provide an improved fender and fender shield assembly in which the fender shield is detachably secured to the fender in a novel manner.

Another object of the invention is to provide a fender shield having improved means for attaching a fender shield to a fender.

A further object of the invention is to provide an improved fender shield construction of the type which is applied to the fender by upward movement substantially in the plane of the shield.

A still further object of the invention is to provide improved attaching means for attaching a fender shield of the type which is applied by upward movement substantially in the plane of the shield.

Still another object of the invention is to provide improved suspension means for detachably securing a fender shield of the type which is applied to a fender by upward movement substantially in the plane of shields.

Other objects, features and advantages of the present invention will be readily apparent from the following detailed description of a preferred embodiment thereof, taken in conjunction with the accompanying drawings, in which:

Figure 1 is a fragmentary side elevational view of a vehicle fender and fender shield assembly embodying the features of the present invention;

Figure 2 is an enlarged inside elevational view of the fender shield;

Figure 3 is a top plan view of the fender shield;

Figure 4 is an enlarged fragmentary, sectional view taken substantially along the line IV—IV of Figure 3 and showing the construction of the pivoting bracket holding the latch actuating arm;

Figure 5 is an enlarged sectional view taken along the line V—V of Figure 2 and showing the relationship of the latching and securing member to the fender and fender shield;

Figure 6 is an enlarged fragmentary, sectional view taken substantially along the line VI—VI of Figure 2; and Figure 7 is an enlarged fragmentary, sectional view taken substantially along the line VII—VII of Figure 2.

In a typical assembly embodying the features of the present invention (Figure 1), a fender 10 has a wheel access opening 11 which is closed by a removable fender shield 12 comprising a panel formed from suitable sheet material. The arrangement and construction of the fender and fender shield are such that the lines of the outer surface of the fender shield are substantially a continuation of and blend with the lines of the outer surface of the fender. The fender shield provides a closure which as nearly as practicable appears in the final assembly as a part of the fender.

According to the present invention, the fender shield 12 is so constructed and related to the fender 10 that the fender shield is adapted to be assembled with the fender by lifting the fender shield upwardly in its plane into the wheel access opening 11. To this end, the fender shield has at its opposite ends means cooperating with lower corner portions 13 of the fender at the bottom extremity of the wheel access opening 11 to define the position of the lower portion of the fender shield with respect to the fender; and latching structure is carried at the inside of the fender shield for latching engagement with the fender to suspend and retain the fender shield in assembly with the fender.

The edge of the fender defining the wheel access opening 11 comprises a continuous inwardly directed flange 14 (Figures 5 and 6) of generally return bent curved cross section. To receive the fender flange 14 in assembly, the end and upper margins of the fender shield are provided with a continuous interengagement and reinforcing flange of flaring U-shaped cross section, generally designated 15, providing a channel opening receptively from and behind the fender shield margins. At juncture with the body panel of the fender shield, the flange 15 comprises a relatively long leg portion 15a forming an acute angle with the body panel. An intermediate flange portion 15b extends inwardly from the leg portion 15a and a relatively short inner terminal flange leg 15c extends at a flaring angle spaced inwardly from the leg portion 15a.

As best seen in Figures 5, 6 and 7, a sealing or gasket member strip 16 is securely attached within the channel of the flange 15. This gasket member is preferably formed from a flexibly resilient material such as rubber or an appropriate rubber substitute. The fender-edge opposing surface of the gasket member 16 is shaped to be generally complementary to the convexly curved flange 14 of the fender 10 when the fender shield is in assembled position with the fender. A fixed body portion 16a of the gasket intervenes between the intermediate flange portion 15b and the fender flange 14 while a thinner flange portion 16b of the gasket member intervenes between the outer flange leg 15a and the fender flange 14.

Means are provided on the ends of the fender shield to cooperate with the ends 13 of the fender 10 defining the wheel access opening 11 to define the position of the lower portion of the fender shield with respect to the fender. Herein such means comprising respective clips 17 preferably formed of sheet material such as sheet metal and securely attached as by welding or riveting to the intermediate portion 15b of the fender shield flange 15 (Figures 2, 3 and 6).

Each of the clips 17 is of generally U-shaped cross longitudinal section with a short leg 17a securely attached to the intermediate flange portion 15b and with an intermediate angular portion 17b joining a longer leg 17c formed with a convexly curved flange 17d and disposed at an obtuse angle to the intermediate portion 17b. The length of the various legs of the clips 17 and the curvature of the respective flanges 17d are such that the clips 17 will extend inwardly and then outwardly around the fender shield flange 15 and with sufficient clearance between the clip flanges 17d and the fender flange 14 to bear retainingly and under tension against the inner marginal surface of the fender 10 when the fender shield 12 is assembled with the fender 10 by a generally upward movement into position.

Simple and inexpensive means for securely fastening the gasket member 16 to the flange 15 are provided. To this end each of the clips 17 is constructed with an integral ear-like projection 17e extending from the leg 17a along the contiguous area of the intermediate portion of the fender shield flange 15b. Attaching means such as sheet metal drive screws 18, extend laterally inwardly through each end of the gasket member 16, the intermediate portion 15b of the flange 15 and the ear 17e formed on the clips 17. The ear 17e therefore serves a dual purpose in providing a double thickness of material to afford a more positive attachment for the screw 18 and in providing additional assurance of secure attachment of the clips 17 to the flange 15.

Means to prevent pulling of the heads of the drive screws 18 through the gasket member 16 herein comprise a washer 19 located under the head of each of the screws 18. Both the washers 19 and the heads of the screws 18 are located in recesses either preformed or squeezed into the gasket 16 and of sufficient depth so that the heads of the screws 18 do not contact the flange 14 of the fender 10 when the fender shield assembly 12 is in fully assembled relation to the fender.

The short outer leg 15c of the fender shield flange 15 provides a retaining means in conjunction with the intermediate portion 15b and the longer leg 15a to properly position the gasket 16 when the gasket is held at least at its opposite end portions by the screws 18 in conjunction with the washers 19.

A latching structure is provided to afford a simple, inexpensive and easily operable means for detachably securing the fender shield 12 in properly assembled engagement with the fender 10. In the present instance the latching structure, generally designated as 20, comprises an elongated latching and securing member 21 formed from metal bar stock or heavy metal sheet stock guided at its upper portion by means of a sheet metal guide plate 22. A latch actuating member 23 formed from round metal bar stock or heavy wire stock rotatably mounted in a pivoting bracket, generally designated 24, is pivotally secured at one end to the lower end of the latching and securing member 21.

Means are provided at the upper end of the latching member 21 to afford positive latching engagement of the latching member with the fender flange 14. For this purpose the upper or head portion 21a of the latching member 21 is generally hook-shaped in longitudinal cross section and is adapted to bear downwardly and outwardly on the inner surface of the fender flange 14. Thus the fender shield assembly 12 is held in suspended latched position within the wheel access opening 11 with the gasket member 16 pressed into firm engagement with the fender flange 14.

Means are provided to prevent injury to or failure of the latch-engaged portion of the fender flange 14. To this end a reinforcing strip 25 of generally hook-shaped cross section is attached over the edge of the fender flange 14 and extends into the region of engagement by the latch head 21a.

The upper head portion 21a of the latching member 21 comprises an outwardly extending substantially horizontal leg 21b with a downwardly turned outer end terminal flange 21c. The terminal flange 21c is provided to prevent disengagement of the head portion 21a from the fender flange 14 during the unlatching operation. After completion of the unlatching movement of latch actuating member 23 the fender shield assembly 12 will be removed downwardly in wheel access opening 11 with latch head 21a still hooked over the fender flange 14. The entire assembly may then be moved slightly upwardly and inwardly to disengage latch head 21a from the fender flange.

The head portion 21a of latching member 21, being of relatively flat rectangular cross section, provides a substantial area of contact with the edge of fender flange 14 to insure a stable attachment to the fender flange and to additionally prevent possible injury to said fender flange.

A neck or shank portion 21d of latching member 21 extends downwardly and slants outwardly from the inner end of the head portion leg 21b and is threaded through a guiding slot 22a formed in the guiding plate 22. Due to the slant of the shank portion 21d, the latch head portion 21a will move to an upward and inward position, as shown in dash outline in Figures 2 and 5, to clear the fender flange 14, when the fender shield 12 is moved upwardly in the wheel access opening into position for latching. Conversely, the upper latch head portion 21a will move downwardly and forwardly as the latching member 21 is moved downwardly into the latching position as shown in full outline in Figures 2 and 5. The shank portion 21d is of sufficient length to provide for a substantial clearance between the fender shield flange 15 and the latch head portion 21a to allow for easy installation or removal of the fender shield assembly.

Means are provided to securely attach the guide plate 22 to the intermediate portion 15b of the fender shield flange 15 and in the present instance comprising rivets 26 as seen in Figures 2, 3 and 5.

In order to prevent excessive movement of the latching member 21 in the unlatching direction, means are provided to stop, positively, upward movement of the latching member 21. To this end an S-shaped kink 21e is provided at juncture of the shank portion 21d with the lower body portion of the latch member 21. The shoulder 21e on the latching member 21 provides a positive stop for upward movement of the member 21 by engaging the undersurface of the guide plate 22 when the latching structure is placed in unlatched position, thereby limiting movement of the latching arm 23. This prevents wedging of the latching member 21 in the slot 22a of the plate 22 which could be caused by excessive cocking of the latching member 21 due to the substantially arcuate path described by its lower end during the unlatching movement (Figure 2). Therefore, wearing of or damage to the sides of the slot and hampering of the installation or removal of the fender shield are prevented.

Below the stop shoulder 21e the latching member 21 extends in a generally downward direction toward the lower margin of the fender shield as best seen in Figure 5. The lower end of the latching member terminates in a substantially vertical portion 21f to which the actuating member 23 is attached. A hole 21g through the lower portion 21f provides a bearing for an S-shaped journal end 23a of the latch actuating member 23.

The latch actuating member 23 comprises a lever swingable about the pivoting bracket 24 with a comparatively short actuating arm 23b attaching the S-shaped journal end 23a to a substantially Z-shaped journal section 23c formed in a generally horizontal plane and journalled in the pivoting bracket 24. A longer lever arm or handle portion 23d extends in a direction substantially parallel to and away from the shorter lever arm 23b. This longer lever arm is formed adjacent its free end with a substantially U-shaped loop 23e extending slightly below the bottom of the fender shield assembly 12 when the assembly is attached in full latching position. The loop 23e provides a readily accessible means for manipulating the latch actuating member 23.

Locking means are provided to insure positive locking of the latching structure 20 in latching position. For this purpose a short terminal extremity 23f of the handle arm 23d extends outwardly at substantially 90° and slightly downwardly to provide an interlock structure. The lower margin of the fender shield is provided with an integral inturned stiffening flange 27 comprising a substantially horizontal portion 27a terminating with a relatively short upstanding portion 27b. The terminal extremity 23f of the handle arm 23d is adapted to be hooked over the edge of fender shield flange 27 to accomplish the locking of the latch actuating member 23 in latching position.

The pivoting bracket 24 is mounted on the leg 27a of the lower flange 27 and provides a bearing for the journal 23c of the latch actuating arm 23. The pivoting bracket 24 comprises a generally hat-shaped or inverted U-shaped sheet metal member 28 assembled inside a U-shaped member 29 of heavier sheet metal formed with flanges or ears 29a extending horizontally in opposite directions from the bottom of the U and longitudinally of the flange 27. Complementary oppositely extending flange portions 28a of the hat-shaped member 28 rest upon the ears 29a.

Attaching means are provided to hold the member 28 and the member 29 in assembled relation to one another and to attach the bracket assembly 24 to the fender shield. In the present instance rivets 30 are utilized to accomplish this purpose and as best seen in Figures 4 and 5 are extended through the flanges 28a, the ears 29a and the leg 27a of the lower fender shield flange 27.

In order to provide bearings for pivotally supporting the journal portion 23c of the latch-actuating member 23, the U-shaped member 29 is provided with slots 29c extending transversely through the lower portions of the U arms 29b and up to a point short of the upper ends of the arms into semi-circular ends 29d. The slots 29c and the semi-circular ends 29d are of proper size to receive the journal portion 23c of the latch actuating lever 23. The length of the slots 29c is such that the top surface of the central web section 28b of the hat-shaped member 28, when assembled within the U-shaped bracket member 29, provides a lower bearing surface for the journal section 23c of the latch actuating lever 23 when the journal section is assembled in bearing relation within the semi-circular ends 29d of the slots 29c.

It can be readily seen that assembly of the latching arm 23 with the various members of the pivoting bracket 24 can be quickly and easily accomplished by inserting the journal section 23c into the slots 29c of U-shaped member 29 and then inserting the hat-shaped member 28 into position beneath the journal section 23c in such a manner that the journal section is held in bearing relationship between the semi-circular ends 29d of the slots 29c and the central web section 28b of the hat-shaped member 28.

It is believed that the operation of installing or removing applicant's improved fender shield to or from a fender will be readily understood. Before installation is started, the latching structure 20 is placed in unlocked position as shown by the dotted lines in Figures 2 and 5. With the latching structure in unlatched position an advantageous feature of applicant's invention is made more apparent.

As best seen in Figures 2 and 5, when the latch actuating member 23 is unlocked and the loop handle 23e is moved downwardly the latching member 21 is thereby moved upwardly due to rotation of the latching lever 23 about the pivoting bracket 24. Consequently, the head portion 21a of the latching member 21 is displaced upwardly and inwardly through cooperation of the guide plate 22 and the angularly disposed shank portion 21d. This allows the fender shield to be installed by upward movement in the plane of the shield without interference of the latch head 21a with the fender flange 14.

As the shield assembly 12 is pressed upwardly into position with the latching structure 20 in unlatched position, the brackets 17 serve to align the lower ends of the shield with the lower ends 13 of the wheel access opening 11. The novel arrangement of the brackets 17 as hereinabove described provides means not only for aligning the lower corners of the fender shield, but also to act as spring clips wherein the curved outer flanges 17d of the brackets 17 bear against the inner surface of the fender 10 and thereby draw the fender shield margin in toward the fender flange 14 pressing the gasket member 16 firmly therebetween. Consequently, additional assurance of a firm and rattleproof connection between the fender shield assembly 12 and the fender 10 is provided when the fender shield assembly is in latched position.

After the fender shield assembly has been pressed upwardly into position, the latch actuating member 23 is rotated in a counterclockwise direction as seen in Figure 2 by pressing upwardly on U-shaped loop 23e. This causes the latching member 21 to be drawn downwardly due to rotation of the actuating member 23 about the pivoting bracket 24, bringing the latch head 21a downwardly and outwardly against the reinforcing clip 25 located over the edge of the fender flange 14. The length of the latching member 21 is so arranged that the upper leg 21b of the member will bear on the reinforcing clip 25 to draw the fender shield up into position slightly before the actuating lever 23 has reached a position to permit locking. Therefore, the gasket 16 will be pressed firmly between the fender shield flange 15 and the fender flange 14 as the actuating lever 23 is further rotated into locking position.

Locking of the actuating lever 23 is accomplished by pressing slightly inwardly on the U-shaped loop 23e as the locking portion 23f approaches the lower portion of the fender shield flange 27 in such a manner that the end of the locking portion 23f just clears the flange 27 as the actuating lever 23 is flexed by further rotation. When the locking portion 23f is in a position slightly above the flange 27, the inward force on the lever 23 is released and the locking portion 23f hooks over the fender flange 27, thereby locking the latching structure and firmly holding the fender shield assembly 12 in suspended, latched position.

For releasing and removing the fender shield assembly 12, the reverse action is effected.

It will be understood that modifications and variations may be effected without departing from the scope of the novel concepts of the present invention.

I claim as my invention:

1. In combination in a fender and fender shield assembly, the fender having a wheel access opening defined by an inturned marginal flange, the fender shield having an inturned marginal flange with a resilient gasket member securely attached to the fender-opposing surface of said fender shield flange for nestingly engaging with the fender flange by upward movement of the fender shield into closing relation within the wheel access opening, said fender shield marginal flange and said gasket having cooperative inwardly facing portions opposing an outwardly facing surface of the fender margin to hold the fender shield against inward movement from the assembled relation on the fender, a U-shaped spring clip having a leg securely attached at the inner side of said fender shield on a lower end portion of said fender shield flange and having another leg extending around both of said flanges to engage the inner surface of said fender to hold the lower end portions of the fender shield against outward lateral displacement relative to the fender, and manually operable readily releasable latching mechanism carried by the fender shield and engaging upon the upper portion of the fender flange to secure the upper portion of the fender shield against outward lateral displacement relative to the fender and also to hold the fender shield in vertical position within the wheel access opening.

2. In a latching mechanism for use with a fender shield, an actuating handle lever of circular cross section with a Z-shaped offset in said member forming a bearing journal, a pivoting bracket formed from sheet material and comprising an inverted U-shaped member assembled within a U-shaped member, said U-shaped member having a downwardly opening transverse slot through the bottom of the U, the upper end of said slot forming a pair of bearing surfaces for the bearing journal on said handle member and the top of said inverted U-shaped member forming a lower bearing surface for said bearing journal, an actuated member, means for rotatably attaching one end of said handle lever to said actuated member, the other end of said lever being free to swing about said pivoting bracket for swinging the lever to impart movement to said actuated member.

3. In a latching mechanism for use with a fender shield, a handle lever of circular cross section with a Z-shaped offset in said lever forming a bearing journal, a pivoting bracket formed from sheet material and comprising a hat-shaped member assembled within a U-shaped member, said U-shaped member having a downwardly opening transverse slot through the bottom of the U, the upper end of said slot forming a pair of bearing surfaces for the bearing journal on said handle lever and the top of said hat-shaped member forming a lower bearing surface for said bearing journal, a substantially vertical member located adjacent the inner surface of the fender shield and having an upper portion disposed upwardly and away from the fender shield at an obtuse angle to the main portion of the vertical member, a guiding plate attached to the fender shield formed with a slot in which the upper portion of said vertical member is slidably mounted, a hook-shaped head at the outer side of the upper portion of the vertical member, means for limiting upward movement of the vertical member, and means for rotatably attaching one end of said handle lever to the lower end of said vertical member, the other end of said handle lever being free to rotate about said pivoting bracket to impart vertical movement to said vertical member to provide for releasable engagement of the hook-shaped head with a fender flange.

4. In combination in a fender and fender shield assembly, the fender having a wheel access opening defined by an inturned marginal flange, the fender shield having an inturned marginal flange internestingly inter-engageable with the fender flange by upward movement of the fender shield into closing relation with the wheel access opening, a U-shaped spring clip having one leg securely attached at the inner side of said fender shield on said fender shield flange and having a second leg adapted to engage the inner surface of said fender to hold the lower end portions of the fender shield against lateral displacement relative to the fender, a substantially vertical member located adjacent the inner surface of the fender shield and having an upper portion disposed upwardly and inwardly away from the fender shield at an obtuse angle to the main portion of the member, a guiding plate attached to the fender shield formed with a slot in which the upper portion of said vertical member is slidably mounted, a hook-shaped head at the end of the upper portion of the vertical member, an actuating lever of circular cross section with a generally Z-shaped offset in said handle member forming a bearing journal, a pivoting bracket formed from sheet material and comprising a hat-shaped member assembled within a U-shaped member, said U-shaped member having a downwardly opening transverse slot through the bottom of the U, the upper end of said slot forming a pair of bearing surfaces for the bearing journal in said actuating lever and the top of said hat-shaped member forming a lower bearing surface for said bearing journal, means for limiting upward movement of said vertical member, means for rotatably attaching one end of said handle member to the lower end of said vertical member and the other end of said handle member being free to swing about said pivoting bracket for swinging the lever to impart vertical movement to said vertical member to provide for releasable engagement of the hook-shaped head in said vertical member with said fender flange.

5. In a latching mechanism for use with a fender shield and including a latching member, a lever for actuating the latching member, a pivoting bracket formed from sheet material and comprising a hat-shaped member assembled within a U-shaped member, said U-shaped member having a downwardly opening transverse slot through the bottom of the U, the upper end of said slot providing bearing surface for said actuating lever and the top of said hat-shaped member forming a lower bearing surface for said actuating lever, said actuating lever being adapted to swing about said pivoting bracket to actuate the latching member.

6. In a fender shield assembly, a fender shield having an inturned marginal flange of substantially U-shaped section and opening from the margin of the fender shield to receive a fender margin therein, a clip having a first leg securely attached to the center back portion of said marginal flange adjacent a lower end of the fender shield and having a second leg adapted to engage the inner surface of a fender to hold a lower end portion of the fender shield against lateral displacement relative to the fender, said clip having an ear extending from said first leg thereof along the back of said U-shaped flange, a resilient gasket member disposed in and complementary to the disposed surfaces of said fender shield flange, a drive screw extending through said gasket member, said center portion of said U-shaped flange and said ear on said clip to securely hold one end of said gasket member to said U-shaped flange.

7. In a fender shield assembly, a fender shield having an inwardly disposed marginal flange, a clip having a portion attached to said flange, a resilient gasket member disposed on the fender-opposing side of said flange, and means for attaching the gasket member to said flange comprising a headed drive screw extending through said gasket member from the fender-opposing face of the gasket and with the head of the screw depressed substantially within said face so as to remain clear of the fender when the gasket is pressed against the fender in the assembly of the fender shield with the fender, said screw extending also through the fender shield flange and in securing relation through the attached portion of said spring clip.

8. In combination in a fender shield, an inturned flange on the upper margin of the shield, a guide member carried by and extending substantially horizontally inwardly from said flange, a latching member having a generally vertically extending body and a generally hook-shaped head directed outwardly above said flange, said head having a downwardly and outwardly slanting neck slidably guided by said guide member, said neck and body being relatively offset at their juncture and said juncture providing an upwardly facing shoulder engageable with said guide member to limit upward movement of the latching member, and means carried by the lower portion of the fender shield for reciprocating said latching member.

9. In combination in a construction of the character described, a fender having a wheel access opening therein adapted to be closed by a fender shield having a latch including a hook for suspending the fender shield and having a generally horizontally extending portion, said fender having a generally inturned upper marginal flange defining the upper portion of the wheel access opening and including a generally inwardly and upwardly extending edge engageable by said horizontally extending portion of the latch hook, and a generally hook-shaped guard and reinforcing member hooked over said flange edge and extending over a substantial portion of the upwardly facing surface of the flange for reinforcing the flange and more especially said edge in the region thereof engageable by the hook portion of the latch.

10. In combination in a fender shield assembly, a normally generally vertically extending fender shield panel having a lower inturned normally generally horizontally extending marginal flange, a pair of interengaged bracket members defining therebetween a normally generally horizontally extending bearing, means securing the brackets fixedly to said inturned flange, a normally generally vertically extending latch member carried by the panel, and a manipulating member for the latch member including a normally horizontally extending journal portion engaging the bearing provided by said brackets so that operation of said manipulating member about the normally generally horizontal axis of said journal portion operates the latch member.

11. In combination in a fender shield assembly, a fender shield panel having a lower inturned marginal flange, a pair of interengaged bracket members defining therebetween a bearing, means securing the brackets fixedly to said inturned flange, a latch member, and a manipulating member for the latch member including a journal portion engaging the bearing provided by said brackets so that operation of said manipulating member about the axis of said journal portion operates the latch member, said interengaging bracket members having overlapping flanges superimposed upon said inturned flange and secured thereto by said securing means.

12. In combination in a fender shield assembly, a fender shield panel having a lower marginal inturned flange extending throughout a major portion of the length of the fender shield panel, said flange being substantially flat and horizontal and having at an intermediate portion thereof a part that is substantially wider than the remainder of the flange toward the opposite ends of the fender shield, fender shield latch structure carried by said wider part of said flange, and an upstanding reinforcing angularly related terminal portion on said flange extending throughout substantially the length of said flange continuously including said wider part of the flange and reinforcing the flange to withstand substantial strains and stresses in service, said flange terminal portion having at the places where the wider and narrower portions of the flange meet juncture portions which are angular to the remainder of the terminal portion and afford stiffening reinforcement for the flange terminal portion.

GEORGE W. SCHATZMAN.

References Cited in the file of this patent

UNITED STATES PATENTS

| Number | Name | Date |
|---|---|---|
| 1,954,919 | Carey | Apr. 17, 1934 |
| 2,059,305 | Best | Nov. 3, 1936 |
| 2,092,506 | Haltenberger | Sept. 7, 1937 |
| 2,115,768 | Haltenberger | May 3, 1938 |
| 2,157,921 | Schatzman | May 9, 1939 |
| 2,215,619 | Patrick et al. | Sept. 24, 1940 |
| 2,217,046 | Fergueson | Oct. 8, 1940 |
| 2,222,619 | Jandus | Nov. 26, 1940 |
| 2,288,725 | Lyon | July 7, 1942 |
| 2,369,035 | Fergueson | Feb. 6, 1945 |